Figure 1:
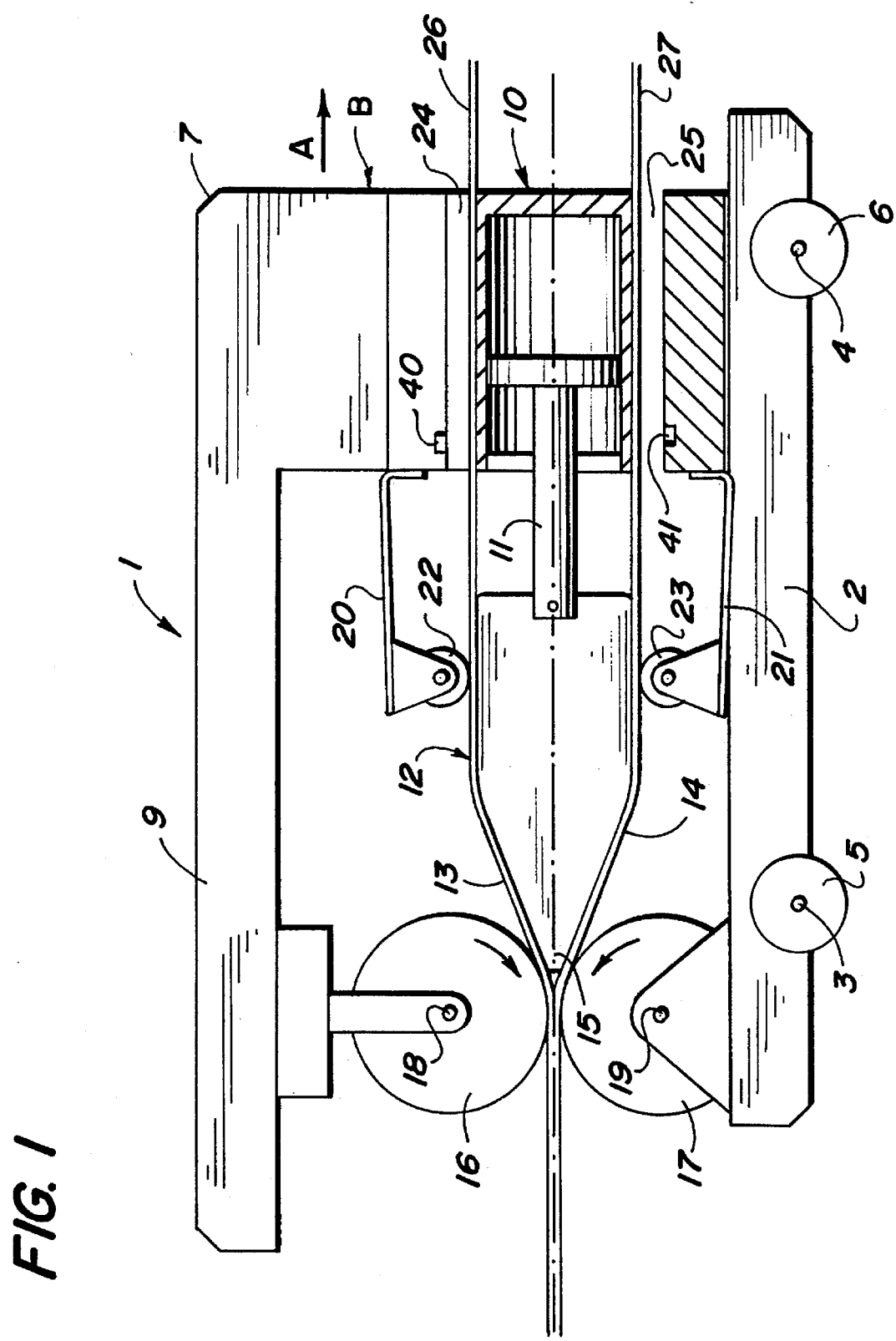

United States Patent [19]

Kaminski

[11] Patent Number: 5,490,626
[45] Date of Patent: Feb. 13, 1996

[54] DEVICE FOR WELDING FOIL EDGES

[76] Inventor: Renald Kaminski, An der Friedensburg 2, 52511 Geilenkirchen, Germany

[21] Appl. No.: 337,476

[22] Filed: Nov. 8, 1994

[30] Foreign Application Priority Data

Nov. 9, 1993 [DE] Germany ............... 9317104 U

[51] Int. Cl.$^6$ ................................................. B23K 20/04
[52] U.S. Cl. ................ 228/44.3; 228/235.2; 100/93 RP; 156/499
[58] Field of Search .......................... 228/44.3, 17, 265, 228/235.2; 100/93 RP; 156/499, 555

[56] References Cited

U.S. PATENT DOCUMENTS

| | | | |
|---|---|---|---|
| 4,146,419 | 3/1979 | Neidhart | 156/499 |
| 4,714,514 | 12/1987 | Hoopengardner | 156/391 |
| 4,923,558 | 5/1990 | Ellenberger et al. | 156/499 |
| 5,051,148 | 9/1991 | Resch | 156/499 |
| 5,169,052 | 12/1992 | Kaminski | 228/9 |
| 5,328,545 | 7/1994 | Kaminski | 100/93 RP |

FOREIGN PATENT DOCUMENTS

| | | |
|---|---|---|
| 351754 | 5/1976 | Austria . |
| 102337 | 2/1973 | German Dem. Rep. . |
| 1279320 | 11/1963 | Germany . |
| 1203450 | 5/1966 | Germany . |
| 2433533 | 7/1974 | Germany . |
| 3535759 | 10/1985 | Germany . |
| 88162877 | 6/1988 | Germany . |
| 4000017 | 1/1992 | Germany . |

*Primary Examiner*—Samuel M. Heinrich
*Attorney, Agent, or Firm*—Joseph W. Berenato, III

[57] ABSTRACT

The invention relates to a device for the overlapping welding of foil edges. The device has heating surfaces for heating the foil edges. In order to achieve uniform heating of the foil edges, longitudinal ribs are provided over the entire width of the heating surface. Hereby it was found to be advantageous if the heating surfaces are constructed rib-free, i.e. smooth, in the starting area provided for the leading in of the foil edges. In this starting area, the foil edges are plastified at the leading-in surfaces first to such an extent that the longitudinal ribs are able to burrow themselves into these surfaces from the start.

5 Claims, 2 Drawing Sheets

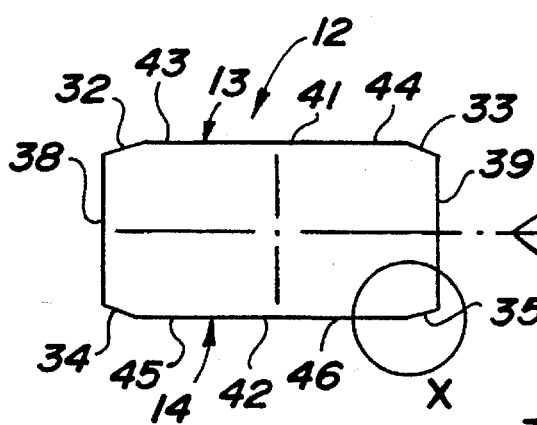
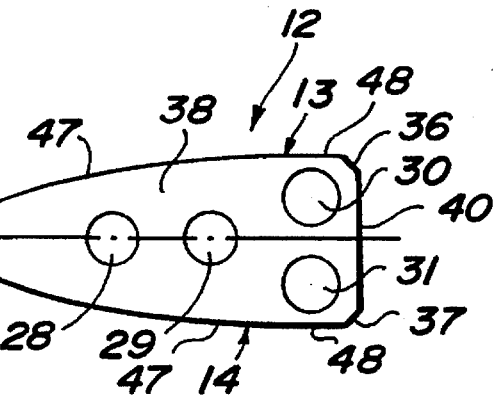
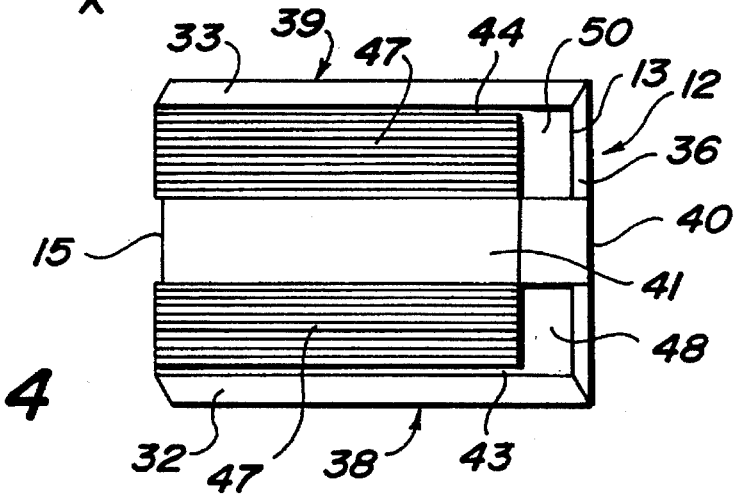
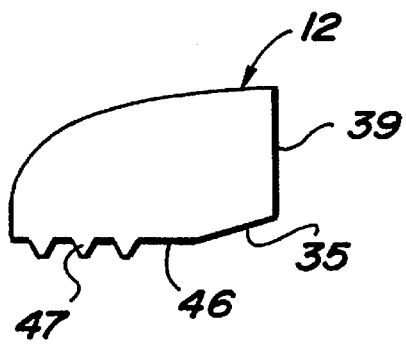

DEVICE FOR WELDING FOIL EDGES

The invention relates to a device for the overlapping welding of foil edges, said device having heating surfaces for heating the foil edges.

Such devices are used in particular for welding foils in landfill construction. Here, the requirements on the welding quality are high, since absolute tightness must be ensured.

Known devices (cf. DE-OS 40 00 017) are constructed as mobile units in which foil edges designed in an overlapping manner enter the device on top of each other as it moves and are passed over a wedge-shaped heater. This wedge-shaped heater is arranged horizontally, i.e. the two wedge surfaces are located on top of each other and the parallel end faces are oriented vertically. The heater points with its blunt end towards the inlet. The top foil edge is hereby passed over the wedge surface on the top, and the bottom foil edge over the wedge surface on the bottom. Both wedge surfaces merge towards the back into a line-shaped wedge tip where the two foil edges are combined and pressed on top of each other via pressure and feed rolls provided there. The pressure and feed rolls pull the foil edges into the device and thus provide the feeding of the device.

The heater exhibits several heating elements heating the wedge surfaces, so that the wedge surfaces form heating surfaces. The heater also holds temperature sensors connected to a temperature regulator. The latter controls the heating elements so that a set temperature adapted to the material of the foil edges is maintained. Hereby the set temperature is so high that the foil edges are plastified in such a manner as to be welded to each other under the effect of the pressure and feed rolls following the heater.

The wedge surfaces of the known heaters are constructed smoothly so that the foil edges can contact them over the entire surface. In the center part, the wedge surfaces may be sunk in to some extent in order to prevent a heat transfer and thus plastification of the foil edges in this area. In this manner, the wedge surfaces each have two spaced apart heating surfaces, and during the subsequent pressing together of the foil edges two welding seams are created that have between them a hollow space corresponding to the width of the sunk part of the wedge surfaces. In order to test the welding seams, this hollow space can be filled with pressurized air.

In spite of the significant control-technological expenditure for controlling the heating elements, the welding of the foil edges is not always accomplished in an optimum manner. This invention is thus based on the task of designing a device of the initially mentioned type in such a way that the reliability of the foil edge welding is further improved.

According to the invention this task is solved in that the heating surfaces are provided with longitudinal ribs. Hereby longitudinal ribs should be understood to mean ribs with such an orientation as to extend in the direction of the movement of the foil edges through the device, i.e. in case of a wedge-shaped heater, in the direction from blunt inlet towards the wedge tip. The longitudinal ribs burrow themselves in during the plastification of the foil edges that move over them and ensure—apparently due to the enlarged surface—a significantly quicker, more intensive, and deeper heat transfer, and thus an improved plastification of the foil edge surfaces. The result is a significantly improved reliability of the foil edge welding. In addition, the design as claimed in the invention permits a higher processing speed. Hereby it is possible to work with lower temperatures, thus saving energy. A side effect not to be neglected—since it increases the precision of the weld—is that the longitudinal ribs improve the guidance of the foil edges over the heater or over the heaters in the sense that the foil edges are guided exactly in the direction of the longitudinal axis of the heater or heaters.

An embodiment of the invention provides that the longitudinal ribs project upwards so as to taper off from a broad base, i.e. form a tip. In this way, they burrow themselves especially well into the surfaces of the foil edges. A triangular cross-section of the longitudinal ribs is useful.

In order to achieve uniform heating of the foil edges, longitudinal ribs shall be provided over the entire width of the heating surface. Hereby it was found to be advantageous if the heating surfaces are constructed rib-free, i.e. smooth, in the starting area provided for the leading in of the foil edges. In this starting area, the foil edges are plastified at the leading-in surfaces first to such an extent that the longitudinal ribs are able to burrow themselves into these surfaces from the start.

The drawing clarifies the invention in more detail using an embodiment. In the drawing:

FIG. (1) shows the lateral view of a device for welding foil edges;

FIG. (2) shows the insulated lateral view of the heater in the device according to FIG. (1);

FIG. (3) shows a cross-section through the heater according to FIG. (2);

FIG. (4) shows a top view of the heater according to FIGS. (2) and (3);

FIG. (5) shows an enlargement of an excerpt of detail X in FIG. (3).

The device (1) shown in FIG. (1) comprises a chassis (2) with two driving axes (3, 4), each of which carries two wheels (5, 6). The device (1) can be driven in the drawing plane, whereby the main driving direction during foil welding is indicated by arrow (A).

A device arm (7) with a vertically projecting part (8) and a part (9) extending horizontally backward are attached to the chassis (2). A telescopic cylinder device (10) is fixed in the vertical section (8) so that its piston rod (11) projects towards the back. A wedge-shaped heater (12) is attached to its free end. It has a top wedge surface (13) and a bottom wedge surface (14). Both wedge surfaces (13, 14) taper off towards the back and merge to form a wedge tip (15). The heater (12) extends several centimeters vertical to the drawing plane.

A pair of pressure and feed rolls (16, 17) is arranged adjacent to the wedge tip (15). The two pressure and feed rolls (16, 17) have horizontal rotation axes (18, 19), whereby these rotation axes (18, 19) are located in a vertical plane. At least one of the pressure and feed rolls (16, 17) is preloaded with a corresponding pressure load in the direction towards the other pressure and feed roll (16, 17), and at least one of the pressure and feed rolls (16, 17) is driven. Instead of one pair of pressure and feed rolls (16, 17), it is also possible to provide two pairs behind each other, whereby the first pair, i.e. the one directly next to the wedge tip (15), functions solely as a pressure roll pair, and the pair behind it solely as a feed roll pair.

The vertical part (8) of the device arm (7) furthermore holds spring brackets (20, 21) that extend in the direction of the heater (12) and carry pressure rolls (22, 23). The spring brackets (20, 21) press these pressure rolls (22, 23) in the direction towards the wedge surfaces (13, 14).

Horizontal feed slots (24, 25) extend through the vertical section (8) of the device arm (7). The top feed slot (24) is open towards the viewer of FIG. (1). The bottom feed slot (25) is closed towards the viewer of FIG. (1)—which is why this part is shown as a section—and is open in the direction away from the viewer.

Both inlet slots (24, 25) serve to thread overlapping foil edges (26, 27), whereby the top foil edge (26) belongs to one foil that extends towards the viewer, and the bottom foil edge (27) belongs to a foil that extends away from the viewer. The device (1) hereby moves in longitudinal direction of the foil edges (26, 27) according to arrow (A). Hereby the foil edges (26, 27) enter the feed slots (24, 25) while being correspondingly lifted up from the ground, pass through them, and are then guided via the wedge surfaces (13, 14) of the heater (12) while being in contact with the same, whereby they are pressed against it via pressure rolls (22, 23). As explained in more detail for FIGS. (2) to (5), the foil edges (26, 27) at the wedge surfaces (13, 14) are heated to such an extent that they, no later than on reaching the wedge tip (15), are plastified on their inside to such an extent that they are welded to each other when passing through the slot between pressure and feed rolls (16, 17). The feeding of the device (1) is brought about by the pressure and feed rolls (16, 17).

The more detailed design of the heater (12) can be seen in FIGS. (2) and (5). The heater (12) has a total of four bores for inserting rod-shaped heating elements. The heater (12) has—as is shown in particular in FIG. (3)—a rectangular cross-section, whereby the wedge surfaces (13, 14) merge via bevels (32, 33, 34, 35, 36, 37) into side surfaces (38, 39) and the front surface (40). In the center, the wedge surfaces (12, 13) have sunk strips (41, 42) that extend over the length of the heater (12). This part of the wedge surfaces (13, 14) thus does not come into contact with the foil edges (26, 27).

Between the bevels (32, 33, 34, 35, 36, 37) and strips (41, 42) are those parts at which the foil edges (26, 27) come into contact with the heater (12). They form the heating surfaces (43, 44, 45, 46), whereby two heating surfaces (43, 44)—spaced apart by strip (41)—extend on the top wedge surface (13), and two heating surfaces (45, 46)—spaced apart by strip (43)—extend on the lower wedge surface.

The heating surfaces (43, 44, 45, 46) exhibit a number of longitudinal ribs—designated e.g. as (47)—that are parallel to each other and extend in the moving direction of the foil edges (26, 27) up to the wedge tip (15). As seen in the detail enlargement according to FIG. (5), the longitudinal ribs (47) have a triangular cross-section, i.e. form a tip towards the outside. The longitudinal ribs (47) start at a certain distance to the front surface (40) so that rib-free, i.e. smooth, starting areas (48, 49, 50) are formed there.

When operating the device (1), the foil edges (26, 27) first contact the starting areas (48, 49, 50) of the heating surfaces (43, 44, 45, 46). They are there plastified by even contact to such an extent that the subsequent longitudinal ribs (47) burrow themselves into the surfaces of the foil edges (26, 27) facing each other. This results in a heat transfer that is significantly more intensive than in the case of smooth heating surfaces, resulting in a subsequent welding of the foil edges with higher reliability.

I claim:

1. Device for the overlapping welding of foil edges, said device having heating surfaces for heating the foil edges, characterized in that heating surfaces (43, 44, 45, 46) are provided with longitudinal ribs (47).

2. Device as claimed in claim 1, characterized in that the longitudinal ribs (47) project upwards so as to taper off from a broad base.

3. Device as claimed in claim 2, characterized in that the longitudinal ribs (47) have a triangular cross-section.

4. Device as claimed in claim 1, characterized in that longitudinal ribs (47) are provided over the entire width of heating surfaces (43, 44, 45, 46).

5. Device as claimed in claim 1, characterized in that the heating surfaces (43, 44, 45, 46) are constructed free of ribs in the starting area (48, 49, 50) intended for the leading in of the foil edges (26, 27).

* * * * *